Figure 1:
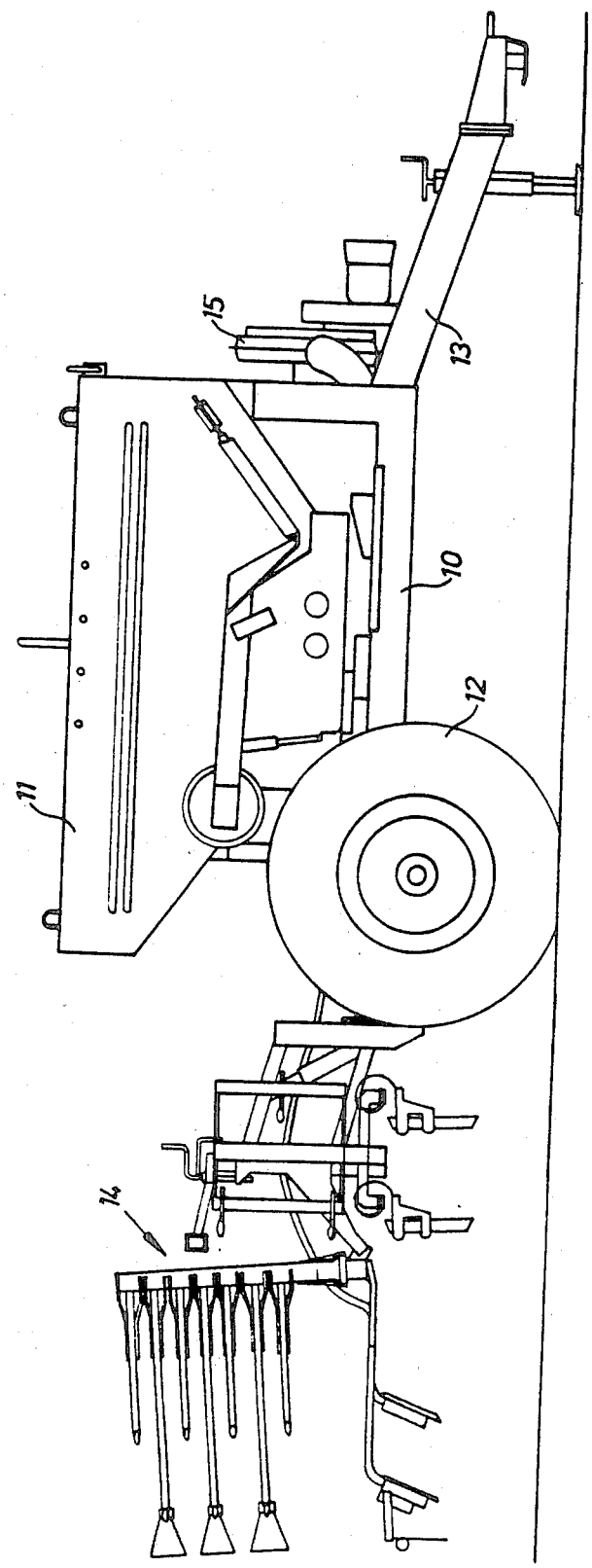

United States Patent [19]

Andersson

[11] Patent Number: 4,700,640
[45] Date of Patent: Oct. 20, 1987

[54] DEVICE IN A COMBINED DRILL FOR SIMULTANEOUSLY SPREADING SEED AND FERTILIZER

[75] Inventor: Stig G. Andersson, Skurup, Sweden

[73] Assignee: Aktiebolaget Overums Bruk, Sweden

[21] Appl. No.: 915,916

[22] Filed: Oct. 3, 1986

Related U.S. Application Data

[63] Continuation of Ser. No. 698,425, Feb. 5, 1985, abandoned.

[30] Foreign Application Priority Data

Feb. 7, 1984 [SE] Sweden .................... 8400608

[51] Int. Cl.⁴ .............................................. A01C 5/00
[52] U.S. Cl. ............................................ 111/1; 111/73;
111/85; 222/129; 220/22
[58] Field of Search .................... 222/129, 134, 564;
220/20.5, 22, 4 R, 4 A, 22.1, 335, 340, 367,
370–372, 365; 111/73, 80, 69, 52, 1, 74, 75, 85;
209/420–421, 259, 370–373; 215/248

[56] References Cited

U.S. PATENT DOCUMENTS

| 486,919 | 11/1892 | Winget | 222/129 X |
| 621,559 | 3/1899 | Ebert | 220/335 X |
| 857,742 | 5/1907 | Lanquist | 222/134 X |
| 1,517,430 | 12/1924 | Johnson | 222/129 |
| 1,663,574 | 3/1928 | Venable | 222/129 X |
| 1,709,211 | 4/1929 | Graham | 222/134 |
| 2,159,659 | 5/1939 | Johnson et al. | 222/129 X |
| 2,320,471 | 5/1943 | Roesch | 222/134 X |
| 2,583,862 | 1/1952 | Lichtenstein | 209/370 X |
| 3,174,652 | 3/1965 | Villemure | 222/134 X |
| 3,428,219 | 2/1969 | Solum | 222/134 |
| 3,432,064 | 3/1969 | Ten Pas et al. | 220/22 R X |
| 3,915,343 | 10/1975 | Barcock | 111/73 X |
| 3,924,783 | 12/1975 | Ward | 222/134 |
| 3,944,118 | 3/1976 | Trill | 222/134 |
| 4,296,695 | 10/1981 | Quanbeck | 111/73 X |
| 4,466,549 | 8/1984 | Hanaway | 220/4 A |

FOREIGN PATENT DOCUMENTS

| 629300 | 12/1961 | Italy | 222/134 |
| 1269360 | 4/1972 | United Kingdom | 222/129 |

Primary Examiner—Robert A. Hafer
Assistant Examiner—Danton DeMille
Attorney, Agent, or Firm—Alfred E. Miller

[57] ABSTRACT

The invention relates to a device in a combined drill for spreading seed and fertilizer simultaneously and comprising a container. The latter is divided by a wall into two compartments of which one is intended to take up the seed and the other to take up the fertilizer. The two compartments are connected by channels to drill coulters or spreaders for covering and spreading, respectively, of the two materials. The two openings of the container (11) are provided with swingable guide plates (30,31,36) to increase the size of the openings and thus make it possible to fill the container, for instance from a load vehicle.

6 Claims, 5 Drawing Figures

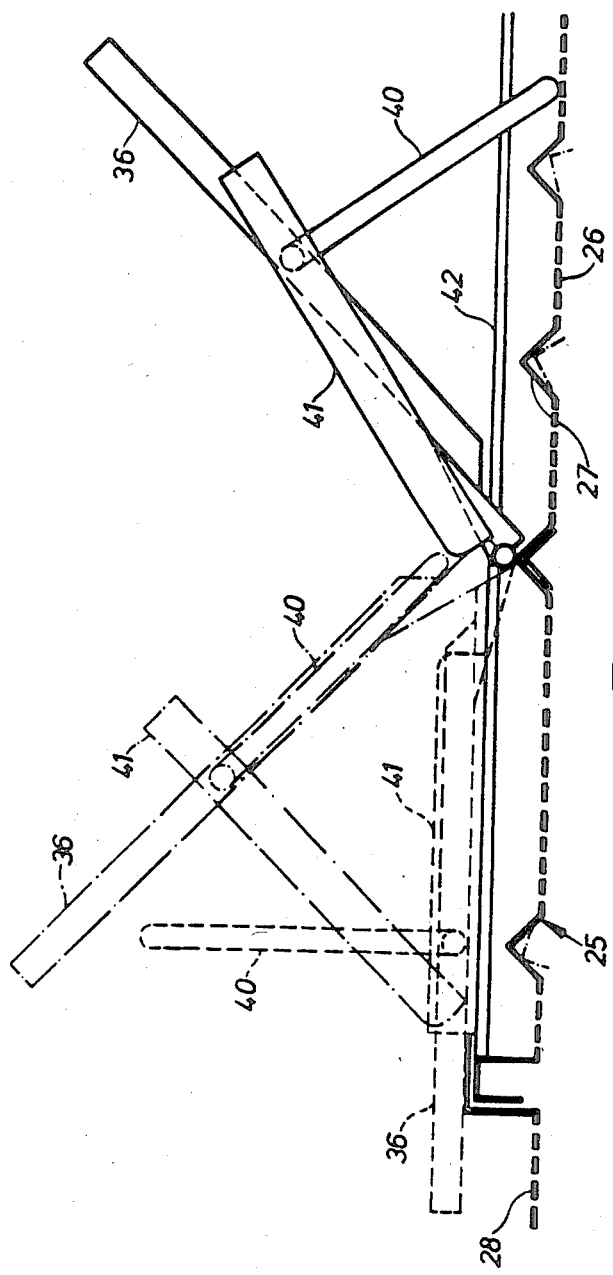

DEVICE IN A COMBINED DRILL FOR SIMULTANEOUSLY SPREADING SEED AND FERTILIZER

This application is a continuation of application of Ser. No. 698,425, filed 2-5-85, now abandoned.

This invention relates to a device in a combined drill for spreading seed and fertilizer simultaneously and comprising a container which by a wall is divided into two compartments of which one takes up the seed and the other takes up the fertilizer, the two compartments by channels being connected to drill coulters or spreaders for covering and spreading, respectively, of the two materials.

Machines of the above type are previously known. In use of the machines, the two materials are filled by emptying, for instance by a bucket, into an opening in the upper part of the container. If the bucket is not placed exactly above the relevant compartment, the material may fall into the wrong compartment and mix with the other material. This is of course not satisfactory since the harvest in such cases will be reduced. The object of this invention is to provide a device in which the material without difficulty can be filled into the correct compartment which, moreover, has a size which can be adjusted to the actual need.

Figure 2:
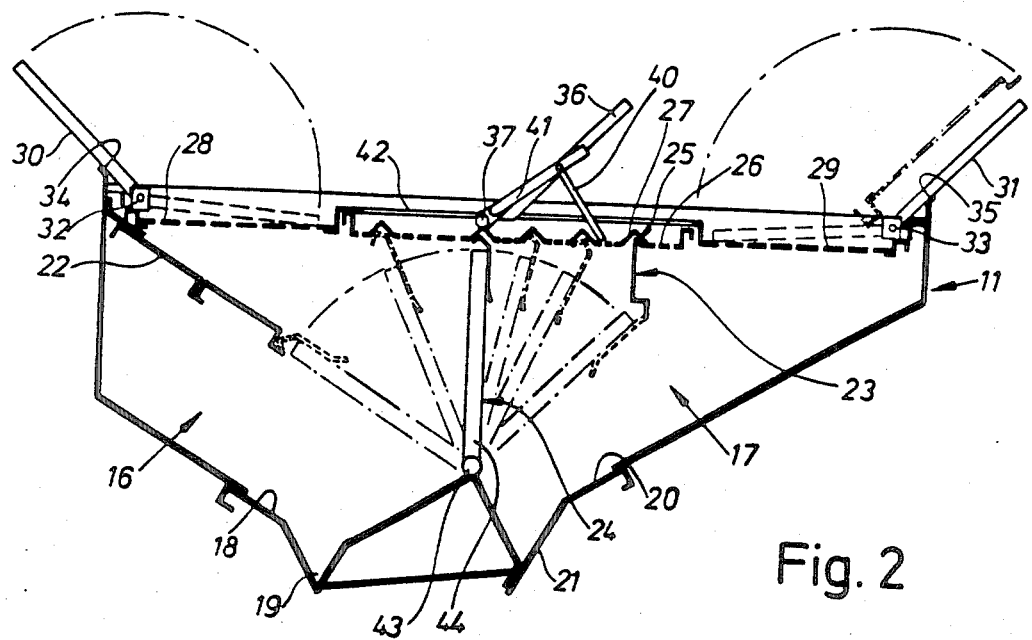
Figure 3:
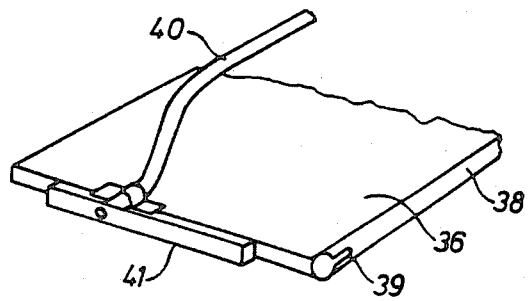
Figure 4:
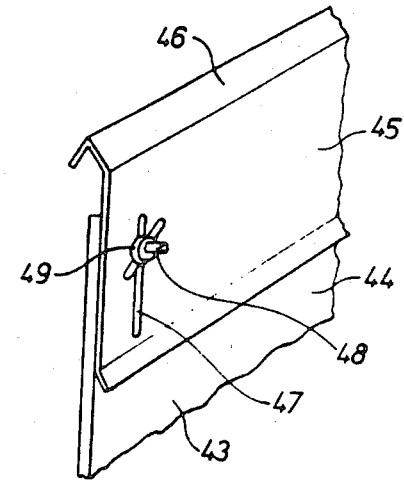

An embodiment of the invention will now be described with reference to the accompanying drawings in which FIG. 1 is a side elevation view of a machine with a device according to the invention, FIG. 2 is a vertical section through the container of the machine, FIGS. 3 and 4 are perspective views of details of the machine, and FIG. 5 to an enlarged scale shows the upper part of the container of FIG. 2 on an enlarged scale.

As appears from FIG. 1, the combined fertilizer and seed spreader comprises a frame 10 with a container 11, a pair of wheels 12, a draw bar 13 and a drill coulter unit 14 with spreaders both for fertilizer and seed. For the transport of the material to be spread from the container 11 to the coulter unit 14 a fan 15 is provided in any conventional way to create an air stream in tubes (not shown) leading from the container to the coulter unit.

The container 11 comprises two compartments 16 and 17, respectively, of which the compartment 16 is used for fertilizer and the compartment 17 for seed. The compartment 16 has a hopper-shaped bottom 18 having an outlet 19 in which a feeding device (not shown) is arranged. In the same way, the compartment 17 has a bottom 20 with an outlet 21. Further, each compartment 16 and 17 has a downwardly directed wall portion 22 and 23, respectively, between which a partition wall 24 can be moved in order to change the volume of the compartments.

Above the central part of the container a central plate 25 is arranged. It comprises several horizontal, perforated parts 26 and several V-shaped ridges 27 which are not perforated. On both sides of the central plate 25 there is a grating 28 and 29, respectively, which can be swung from a lower position, in which the outer part rests on the central plate 25, to an upper position, in which the compartments are accessible for inspection. Each grating is normally covered by a lid formed as a guide plate 30 and 31, respectively, each one being swingable about a shaft 32 and 33, respectively. The guide plates can be moved from their lower positions on the gratings 28 and 29, respectively, to their upper positions in which they abut stops 34 and 35, respectively, at the edges of the container and incline outwards-upwards.

Above the central plate 25 a guide plate 36 is movably fastened between several pins 37 which are placed in pairs opposite each other on the side walls. These pins are disposed immediately above the ridges 27. The guide plate has a shaft 38 which is formed out of a tube, whose one end can be put on one of the pins whereas its other end has an axially directed slot 39. When the guide plate is lowered onto the opposite pin, which is shaped as a plate, and then turned it will be locked on the pins. The central guide plate has a bow 40, which in the lowered position of the guide plate supports a tarpauline. The tarpauline bow 40 is shaped so as to admit co-action with the guide plate 36 and the central plate 25 in order to make it possible to set the guide plate in two upward positions. In one position, the plate is directed to the right so that it will form an opening to the compartment 16, whereas in the other position it is directed to the left and will form an opening for the compartment 17. In order for the bow 40 to work in the manner described, it consists of a bent bar which is swingably fastened to the sides of the guide plate and is provided with two arms 41 directed perpendicular to the bow. In the lowered position, represented by dashed lines in FIG. 5, the bow 40 will be kept in the vertical position since the arms are parallel to the guide plate and each abuts a flange 42. In one of the upper positions, represented by dash-dotted lines in FIG. 5, the bow 40 acts as a support against the guide plate 36. In this position, the bow 40 is prevented from turning since the two arms abut the flange 42. In the other upper position, represented by full lines in FIG. 5, the guide plate is supported by the arms 41. In this position, turning of the arms is prevented since the bow 40 abuts the central plate 25.

The partition wall 24 of the container is turnably fastened to the container by means of a shaft 43 and comprises a lower part 44 having an upper part 45 which is movably fastened. The outer end 46 of the upper part 45 has a shape corresponding to the ridges 27. The upper part 45 has several slots 47 through which bolts 48 projecting from the lower part are inserted. The upper part can be locked to the lower part by means of two finger nuts 49. By loosening these nuts and lowering the upper part, the partition wall can be free and be turned to a position which is suitable with respect to the quantity of seed relative to the quantity of fertilizer. Then the upper part can again be raised and inserted into a suitable ridge or be placed so as to abut the wall portions 22 and 23, respectively, and then be locked by the finger nuts.

I claim:

1. A combined drill for spreading seed and fertilizer simultaneously comprising a container provided with a top, a partition wall for dividing said container into front and rear compartments for seed and fertilizer, respectively, means on the bottom of said container for pivotally mounting said partition wall, a plurality of drill colters and spreaders, a channel connecting each compartment to the respective drill colter and spreader, an inlet opening in said top for each compartment, said top being provided with a first guide plate, means pivotally mounting said first guide plate at the front of said top of said container and at the front of and over one inlet opening, a second guide plate, means pivotally mounting said second guide plate at the rear of said top of said container and over another of said inlet openings, a third guide plate having means for pivotally mounting the same between said first and second guide plates, said third guide plate being provided with means for arranging the same to selectively enlarge both inlet openings of said two compartments, the pivot axis of said third guide plate being adjustable to locate above the upper edge of said partition wall whereby said third guide plate is a continuation of one of the sides of said partition wall and functions as a guide to direct the material in one of the compartments, and means on said partition wall for adjusting the length of the same to change the volume of each compartment.

2. A combined drill as claimed in claim 1 further comprising a bow engaging said third guide plate and supporting the latter on said container when said third guide plate is pivoted upwardly to said position for enlarging one of said inlet openings.

3. A combined drill as claimed in claim 1 further comprising a grating positioned underneath said third guide plate, said grating having spaced hollow ridges, and said upper edge of said partition wall being inserted and held in a selected recess of a hollow ridge to thereby change the volume of one of said compartments.

4. A combined drill as claimed in claim 3 wherein said partition wall comprises two parts which are telescopically mounted relative to each other, and upper edge of one of said parts can be moved into and latched into one of said recesses.

5. A combined drill as claimed in claim 4 wherein the lower part of said partition wall is shaped as a tube, and means pivotally supporting said tube on opposite side walls of said container.

6. A combined drill as claimed in claim 1 further comprising an abutment stop for said first and second guide plates, and wherein in the extreme pivoted position of said first and second guide plates each of said plates engages the respective abutment stop to prevent further rotation of the plate.

* * * * *